Sept. 20, 1966     K. TRÜMPER ET AL     3,273,516
LONGITUDINAL SHOCK ABSORBING ASSEMBLY FOR VEHICLES
Filed July 7, 1964     8 Sheets-Sheet 1

Inventors
Konrad Trümper
Karl Raab
by Michael J. Striker

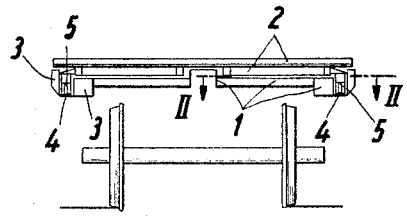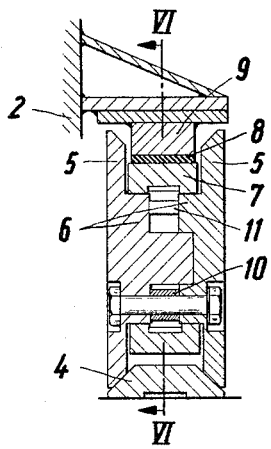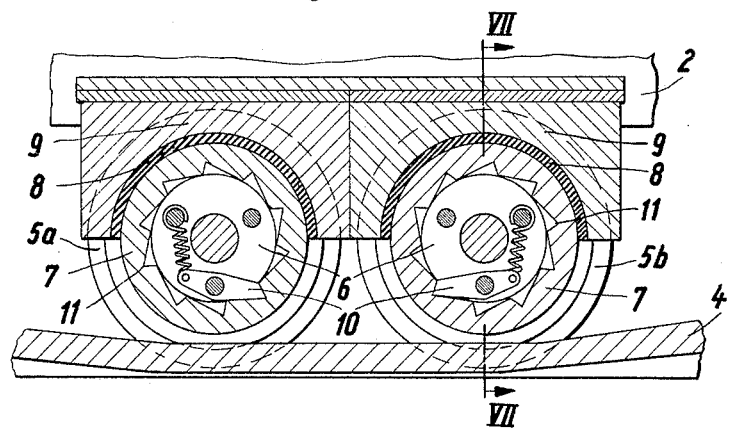

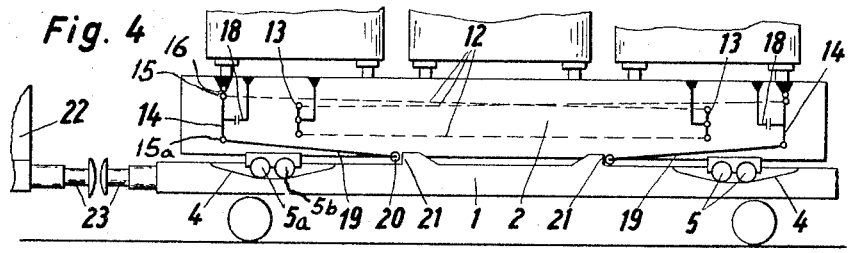
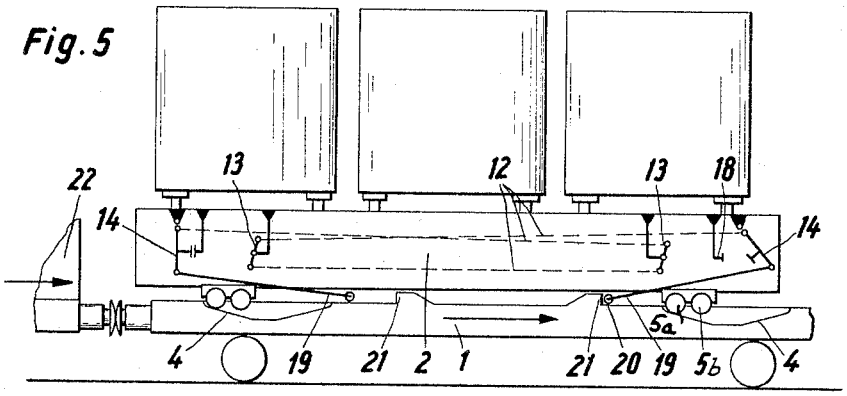
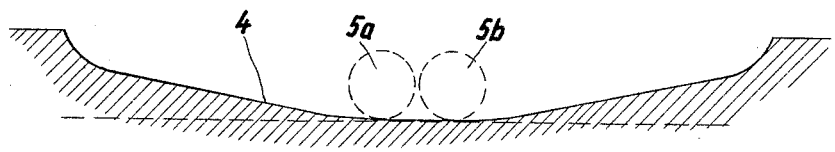

Sept. 20, 1966  K. TRÜMPER ET AL  3,273,516
LONGITUDINAL SHOCK ABSORBING ASSEMBLY FOR VEHICLES
Filed July 7, 1964  8 Sheets-Sheet 4

Inventors
Konrad Trümper
Karl Raab
by Richard J. Striker

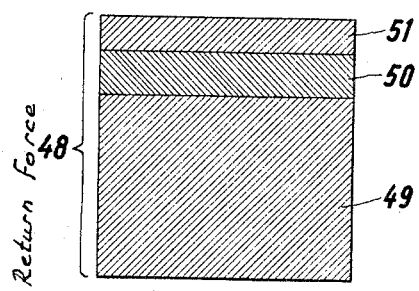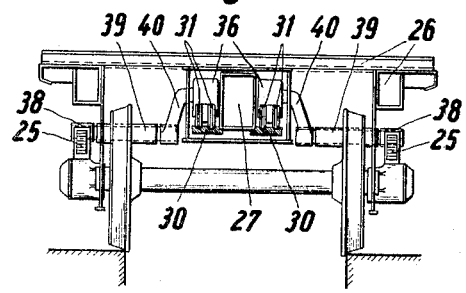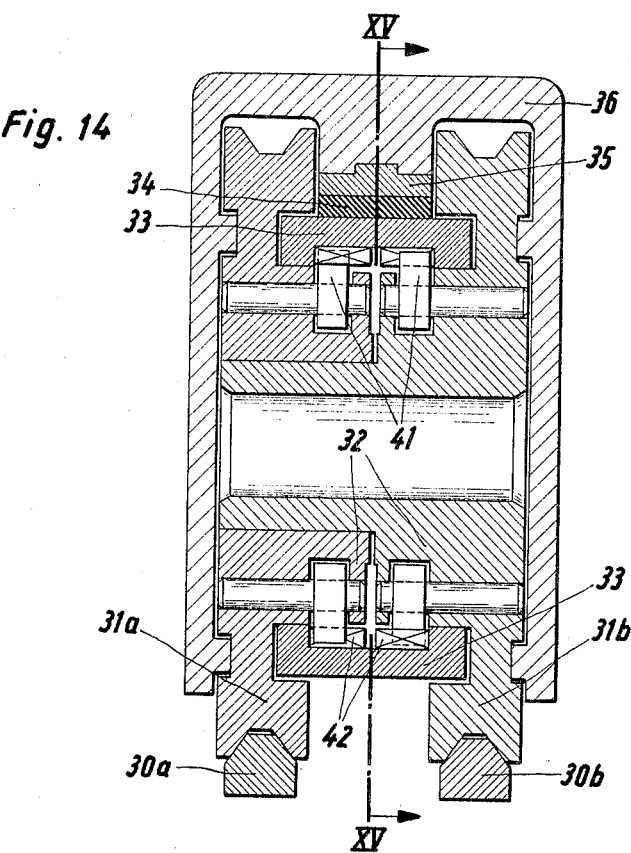

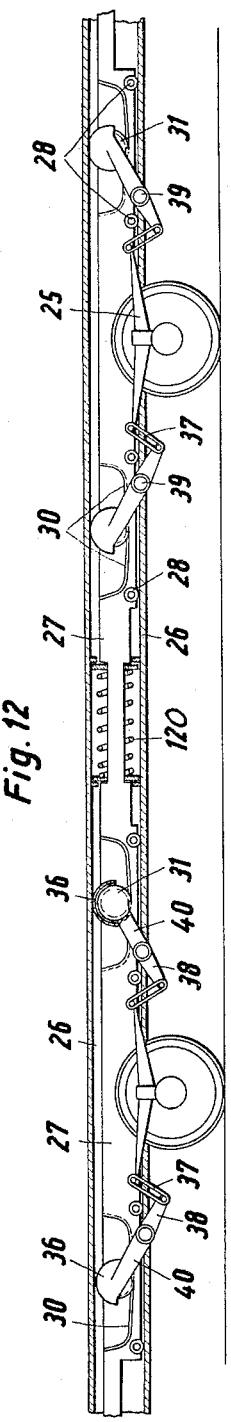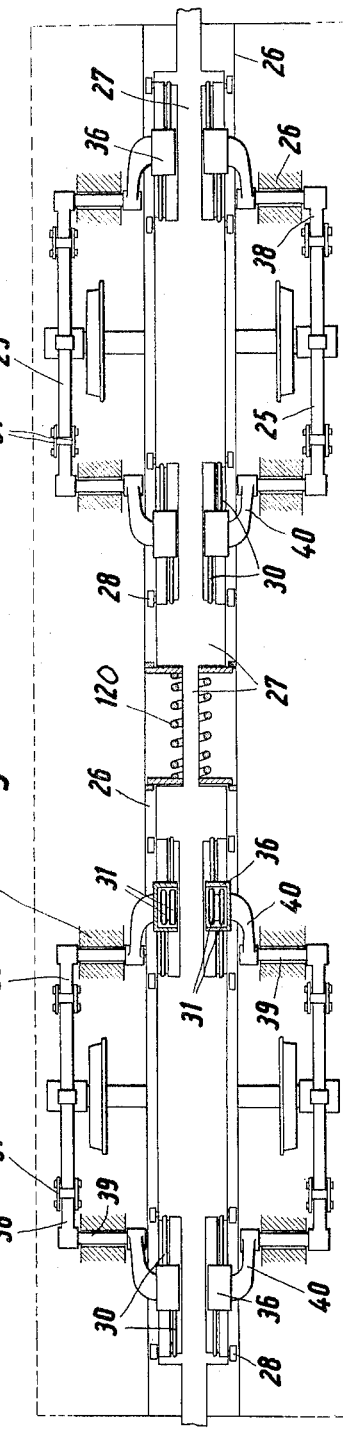

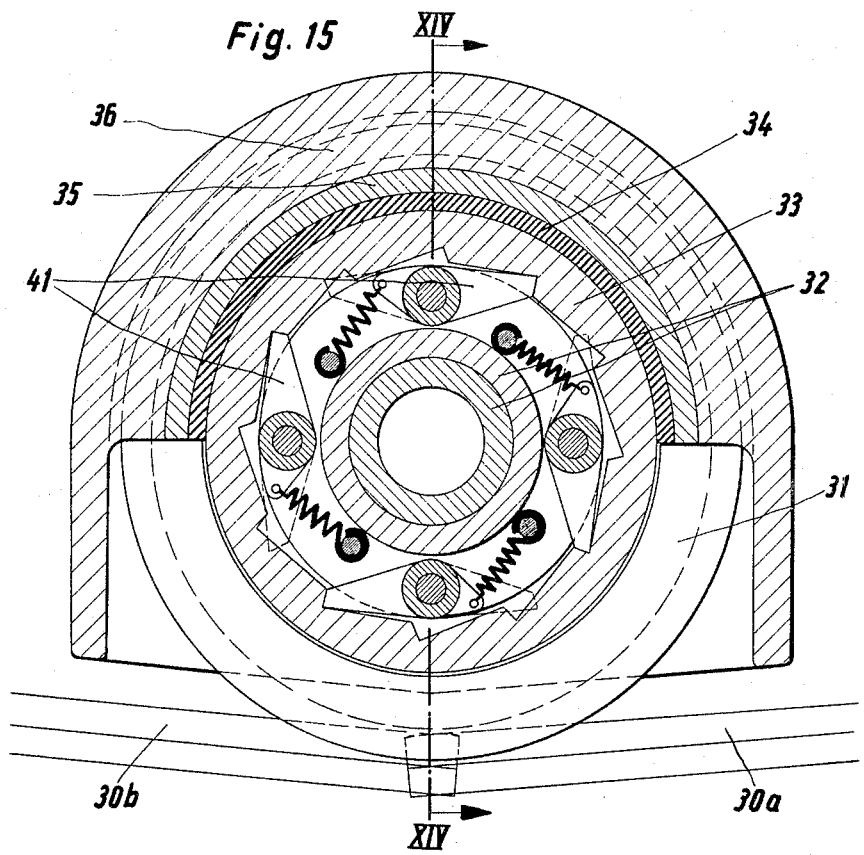

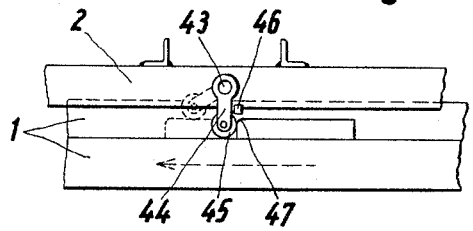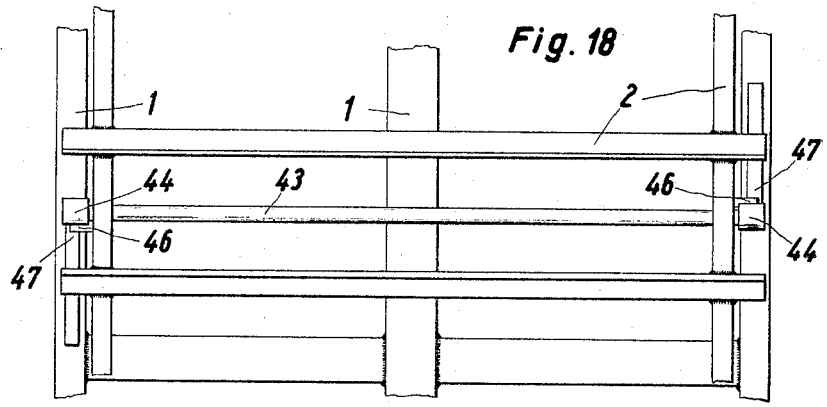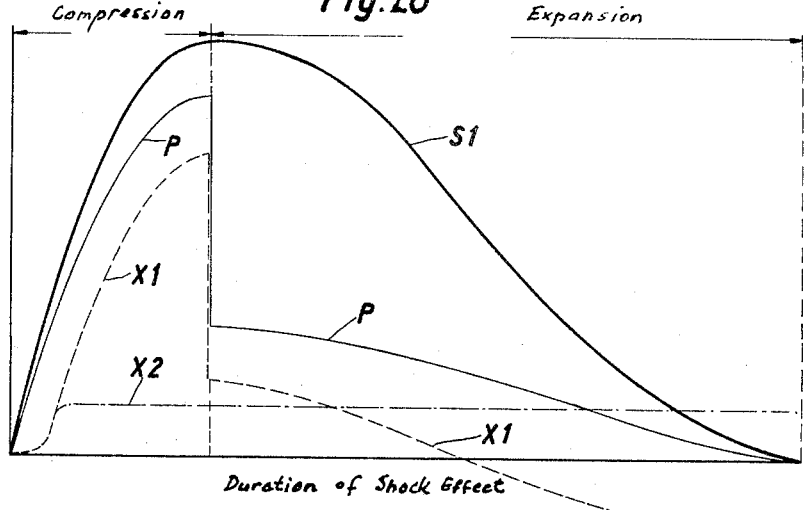

United States Patent Office 3,273,516
Patented Sept. 20, 1966

3,273,516
LONGITUDINAL SHOCK ABSORBING ASSEMBLY FOR VEHICLES
Konrad Trümper, Weidenau/Siegen, and Karl Raab, Wiesbaden, Germany, assignors to Rheinstahl Siegener Eisenbahnbedarf Gesellschaft mit beschrankter Haftung, Siegen, Germany
Filed July 7, 1964, Ser. No. 380,906
Claims priority, application Germany, July 16, 1963, R 35,680
20 Claims. (Cl. 105—392.5)

The present invention relates to a shock absorbing assembly for vehicles such as railroad freight cars, and more particularly to a shock absorbing assembly for dampening horizontal shocks transmitted to a load when the bumpers of the vehicle collide with a stationary stop or with the bumper of another vehicle.

During switching and shunting operations, railroad vehicles are subjected to very considerable longitudinal shocks so that the load which tends to continue the previous movement due to the action of inertia, is damaged, or even displaced which may cause damage to the vehicle.

It is known to reduce horizontal shocks by suspending the load carrying frame of the car on a shock receiving frame by a pendulum joint, or to provide spring means which tend to hold the load carrying spring in a normal position to which it returns when displaced by a shock.

Other constructions according to the prior art provide rollers on the load carrying frame which support the same on oppositely inclined ramp tracks on the shock receiving frame so that the load carrying frame, when displaced, will tend to roll down the ramp tracks to the normal position so that the return force depends on the gradient of the inclined ramp tracks.

In addition to return springs, mechanical or hydraulic dampening means are provided by the prior art constructions.

However, the known shock absorbing assemblies are incapable of transmitting longitudinal shocks to the load in such a manner that the acceleration of the load is uniform and does not exceed a predetermined maximum, irrespective of the magnitude of the shock and of the mass of the load. Some shock absorbing means according to the prior art provide means for adjusting the dampening force in accordance with the load, but since such adjustment depends on the judgment and attention of the operator, wrong adjustments frequently occur, and the load is damaged by longitudinal shocks.

In known constructions in which roller means run on oppositely inclined ramp tracks, the load carrying frame oscillates before stopping in the normal position. Friction brakes or hydraulic brakes are used for dampening the oscillation, the brake force is independent of the load, so that the load carrying frame is insufficiently braked when the load is heavy, and too much brake when the load is light, so that the load is damaged. Return spring means for urging the load carrying frame to the normal position, have a spring force rapidly increasing when the length of the spring is varied, and being independent of the weight of the load, so that return springs too rapidly accelerate or brake a light load.

It is one object of the invention to overcome the disadvantages of known longitudinal shock absorbing assemblies, particularly for vehicles such as railroad cars, and to provide a longitudinal shock absorbing assembly within which the load carrying frame and the load thereon are accelerated or decelerated by a constant force irrespective of the magnitude of the shock and of the mass of the load.

Another object of the invention is to provide a longitudinal shock absorbing assembly by which the speed of the movement of the load carrying frame relative to the shock receiving frame, and caused by a shock, is reduced by a counter force which depends on the weight of the load.

An other object of the invention is to provide a longitudinal shock absorbing assembly in which the load carrying frame, when moving relative to the shock receiving frame due to a longitudinal shock, is braked by a force depending on the weight of the load.

Another object of the invention is to mount the load carrying frame of a vehicle by means of rollers on the shock receiving frame of the vehicle, and to brake the rollers by a braking force depending on the weight of the load, when the load carrying frame moves in longitudinal direction relative to the shock receiving frame when the latter is subjected to a longitudinal shock.

Another object of the invention is to use the brake means provided for this purpose for supporting the load carrying frame on the rollers rolling on ramp tracks of the shock receiving frame so that the shock receiving frame and the load frame are not positively connected with each other.

With these objects in view, a longitudinal shock absorbing assembly according to one embodiment of the invention comprises shock receiving frame means and load carrying frame means; roller means connected to one of the frame means and rolling on tracks of the other frame means; and brake means actuated by the weight of the load carrying frame and of the load thereon to brake relative longitudinal movement between the two frame means with a force depending on the weight of the load.

In one embodiment of the invention, the shock receiving frame has longitudinal ramp tracks inclined in opposite direction to a horizontal plane, and the load carrying frame rests on the roller means so that the weight of the load carrying frame and of the load thereon are transmitted by the roller means to the shock receiving frame.

Return spring means are preferably provided for urging the load carrying frame to a normal position to which the load carrying frame also returns when rolling back on the inclined ramp tracks. In accordance with the present invention, the return spring means are arranged and constructed in such a manner that the spring force acting on the movable load carrying frame is either substantially uniform along the entire distance of relative displacement between the frames, or is only effective during small displacements of the load carrying frame. During the return of the load carrying frame to positions in which the return spring means are effective, only the force of gravity acts to return the load carrying frame from the ends of the rising ramp tracks toward the lower portions thereof.

In one embodiment of the invention, the shock receiving frame has bumpers and wheels and transmits all forces through the shock absorbing assembly without any positive connection. In another embodiment of the invention, the shock receiving frame is a central longitudinally extending beam which has the ramp tracks and is connected to the load carrying frame by the shock absorbing assembly. The supporting beam is mounted on the support spring which rests on the shafts of the wheels of the undercarriage. In this embodiment, the weight of the load carrying frame and of the load is not directly transmitted to the roller means, but is transmitted to the same by a linkage system. However, in all embodiments of the invention, longitudinal shocks are transmitted between a shock receiving frame and a load carrying frame by longitudinal shock absorbing assemblies including roller means and brake means, and preferably return spring means producing a uniform return spring force.

In the preferred embodiment of the invention, the roller means are coupled by one-way clutch means to a brake ring which is engaged by brake means subjected to a force depending on the weight of the load carrying frame and of the load thereon. Only when the roller means roll upward on inclined ramp tracks, the brake means are coupled to the rotating rollers and brake the same, whereas during downward rolling movement to the normal position of the load carrying frame, the brake means are ineffective since the one-way clutch means are in a disengaged position.

When the load carrying frame moves beyond its normal position after the roller means have rolled down a ramp track, the brake means are again effective to brake the movement of the load carrying frame until the same stops in its normal position.

According to another embodiment of the invention, the brake means do not cooperate with the roller means, but have brake shoes mounted on the load carrying frame and sliding on the rising ramp tracks, or on corresponding faces provided on the shock receiving frame, and are pressed into the braking position by resilient means only when the roller means run upward on the rising ramp tracks, while during the return movement of the rollers in the downward direction, the brake shoes are disengaged and inoperative.

The inclination of the ramp tracks is preferably gradually increased so that even very great longitudinal shock forces do not produce a vertical downward force component acting on the shock receiving springs of the vehicle with such a force that the same are damaged.

In order to produce a substantially constant return force of the return spring means, the same include lever means causing different components of the return spring force to act in differently displaced positions of the load carrying frame, or torsion rods are provided which are effective only while the roller means are on the lower portions of the oppositely inclined ramp tracks.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 3 is a fragmentary cross-sectional view taken on line III—III in FIG. 1;

FIGS. 4 and 5 are schematic side elevations illustrating the embodiment of FIG. 1 in a normal position, and in a different position caused by a longitudinal shock;

FIG. 6 is a longitudinal sectional view taken on line VI—VI in FIG. 7 and illustrating in detail the roller means and brake means provided in the embodiment of FIG. 1;

FIG. 7 is a transverse sectional view taken on line VII—VII in FIG. 6;

FIG. 8 is a fragmentary schematic longitudinal sectional view illustrating the shape of a ramp track, and the normal position of the roller means in the embodiment of FIG. 1;

FIG. 9 is a fragmentary side view of a vehicle provided with the longitudinal shock absorbing assembly according to another embodiment of the invention;

FIG. 10 is a plan view of the embodiment of FIG. 9 with parts shown broken off for the sake of clarity;

FIG. 11 is a cross-sectional view taken on line XI—XI in FIG. 9;

FIG. 12 is a fragmentary longitudinal sectional view illustrating a force transmitting linkage system of the embodiment of FIG. 9 on an enlarged scale;

FIG. 13 is a schematic plan view illustrating the linkage system of FIG. 12;

FIG. 14 is a transverse vertical sectional view illustrating the roller means and brake means of the embodiment of FIG. 9 on an enlarged scale and being taken on line XIV—XIV in FIG. 15;

FIG. 15 is a longitudinal sectional view taken on line XV—XV in FIG. 14;

FIG. 16 is a schematic fragmentary longitudinal sectional view illustrating on an enlarged scale a ramp track provided in the embodiment of FIG. 9, and a roller means in the normal position of the load carrying frame;

FIG. 17 is a fragmentary side view illustrating a modified construction according to the present invention in which a torsion rod provides the resilient force for returning the load carrying frame to its normal position;

FIG. 18 is a fragmentary plan view of the modification shown in FIG. 17;

FIG. 19 is a diagram illustrating the return forces acting on the load carrying frame during relative movement between the same and the shock receiving frame; and FIG. 20 is a diagram illustrating the shock forces acting on the shock receiving frame, and the acceleration and deceleration of the load carrying frame after the vehicle has been subjected to a shock.

Figure 1:
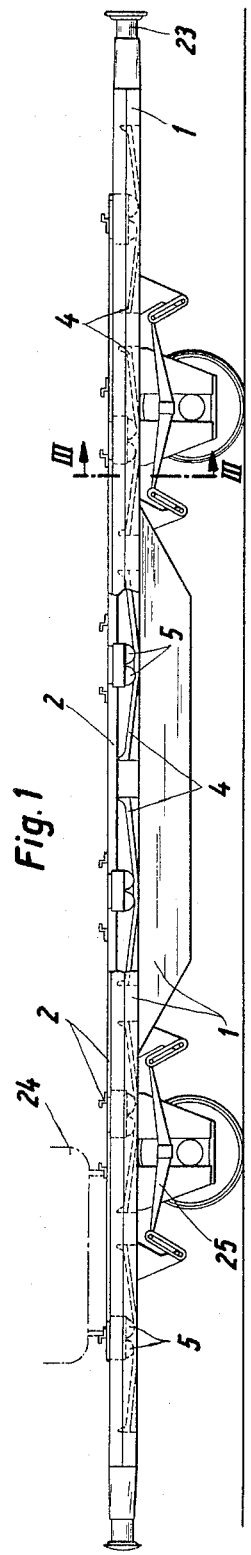
FIG. 1 is a fragmentary side view illustrating a rail vehicle provided with a shock absorbing assembly according to one embodiment of the invention, a lateral part of the shock receiving frame being shown broken off.

Referring now to the drawings, and more particularly to FIGS. 1 to 8, a rail vehicle has an elongated shock receiving frame 1, and a load carrying frame 2 mounted on the shock receiving frame 1 for limited longitudinal movement, and adapted to carry containers 24. Shock receiving frame 1 includes two longitudinal lateral beams 3 to which longitudinally extending ramp tracks 4 are secured. As best seen in FIG. 8, each ramp track 4 has a substantially horizontal center portion, and oppositely inclined ramp portions whose gradient gradually increases from the center portion toward the ends of the ramp tracks. One-fifth of each ramp track adjacent the horizontal center portion defines an angle of four degrees with the horizontal plane, the center portions of the ramp tracks define an angle of substantially 10°, and the ends of the ramp tracks define very steep angles, approaching 80°.

Roller means 5 are secured to the load carrying frame, and preferably include two roller means 5a and 5b mounted adjacent each other with the axes of the rollers located in a horizontal plane. When a shock is exerted on the buffer of the shock receiving frame, the load carrying frame will move in longitudinal direction relative to the shock receiving frame, so that roller means 5a, 5b will roll from the horizontal ramp track portion onto one or the other inclined ramp track, depending on which of the bumpers of shock receiving frame 1 the shock was exerted. If the shock force has the direction of the arrow shown on the left side of FIG. 5, the load carrying frame 2 will be caused by inertia to move relatively to shock receiving frame 1 from the position illustrated in FIG. 4 in which rollers 5 are located on the horizontal central ramp track portion to the position shown in FIG. 5 in which rollers 5a move upwardly along the left inclined ramp tracks. During such movement, the weight of the load carrying frame, and of the load thereon, is transmitted only through roller means 5a to shock receiving frame 1 since roller means 5b do not engage the ramp track. During movement of load carrying frame 1 in the opposite direction, only roller means 5b will be operative.

The construction of the roller means is best seen in FIGS. 6 and 7. Each roller means has a pair of wheel flanges with frusto-conical circumferential faces rolling on corresponding slanted faces of the respective ramp track 4. Due to the wedge effect of this construction, a particularly good frictional engagement is assured. Each wheel flange has a hub portion 6 engaged with the respective other hub portion, the two halves of the roller means being secured to each other by bolts passing through the hub portions 6. One of the hub portions serves as the inner member of a one-way clutch and carries spring loaded coupling pawls 10 which are biased to engage inner teeth 11 on a brake ring 7 surrounding the hub of the roller halves. The pawls 10 are positioned in such a manner that the one-way clutch associated with the roller 5a will couple the brake ring 7 to the wheel flanges of the roller means 5a when the roller means 5a moves to the left in FIG. 6 and in upward direction along the rising ramp track 4. The one-way clutch of roller means 5b will couple the brake ring 7 only when roller means 5b moves in the opposite direction upward on the rising other ramp track 4.

Each brake ring 7 has an outer surface whose upper half is engaged by a semi-circular brake lining 8 secured to a brake shoe 9 which serves as a bearing for the roller means 5. Brake shoes 9 are secured to the load carrying frame 2.

Due to the provision of the one-way clutches, the rotary movement of roller means 5 will be braked when the respective roller means 5a or 5b move upwards on a ramp track 4, while during the rolling back of the respective roller means, the one-way clutch will be disengaged, i.e., the pawl 10 of the respective roller means will ride over the inner teeth 11 of the respective brake ring 7 and the respective roller means will freely roll back to the horizontal center portion of the ramp tracks. When, for example, roller 5a rolls back to the right as viewed in FIG. 6 to the horizontal center portion of the ramp tracks 4, the inertia of the load carrying frame 2 may cause the roller means to move beyond the horizontal portion of the ramp track onto the right rising ramp track portion in which event the roller means 5b will support load carrying frame 2 and the load thereon, while being braked until roller means 5b has reached its highest position, and rolls back again to the horizontal portion of ramp track 4 without being braked.

Due to the fact that the gradient of the ramp tracks is smaller adjacent the horizontal central portion than near the ends of the ramp tracks, only a small vertical downwardly directed component of the force develops when the roller means start moving upon a rising ramp track, so that even a strong shock will not produce a vertical component of such magnitude as to damage the conventional support springs 25 on which the shock receiving frame 1 is suspended, and whose center portions are secured to the bearings of the shafts of the wheels of the vehicle.

However, since the small gradients of the inner portions of the ramp tracks 4 produce a very small horizontal force component to return the roller means to the central position corresponding to the normal position of the load carrying frame 1 as shown in FIG. 4, resilient return means are provided for returning load carrying frame 2 to its normal position after having been displaced by a shock.

Figure 2:
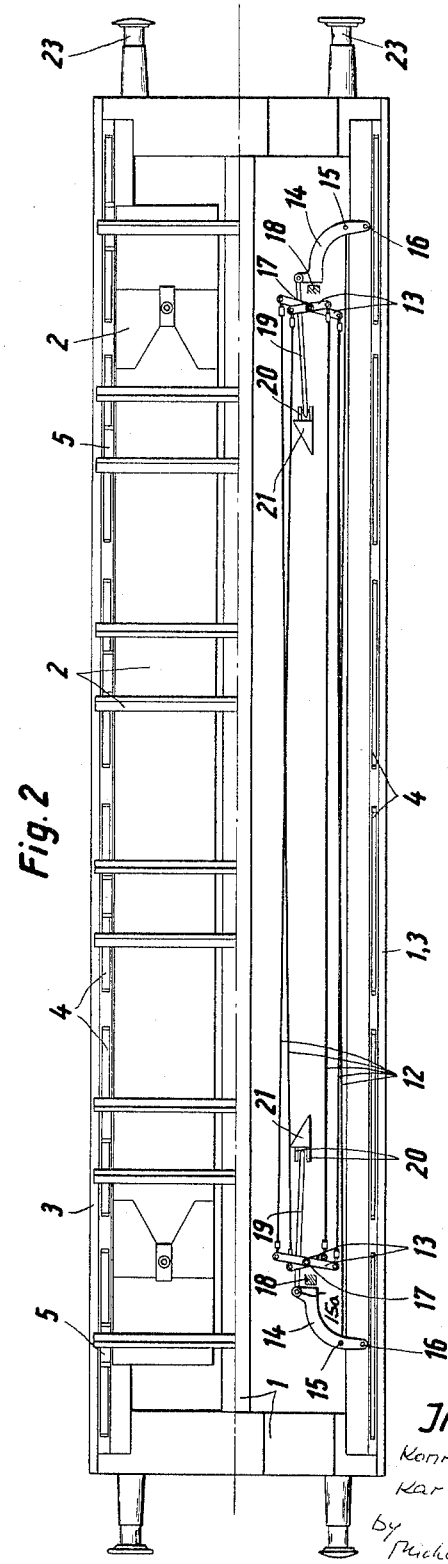
FIG. 2 is a fragmentary plan view of the vehicle shown in FIG. 1, partially in section along line II—II in FIG. 3.

As shown in FIG. 2, and schematically illustrated in FIGS. 4 and 5, the lever means 14 are connected by pivot means 16 to load carrying frame 2 and have abutment portions abutting stops 18 fixed on load carrying frame 2 under the action of elongated resilient rods or cables 12 which consist of spring steel connected by joints 15 to lever means 14.

Double-armed levers 13 are mounted on load carrying frame 2, and connect the elongated resilient cables or rods 12 in such a manner that the resilient expansions of all resilient members 12 are added to each other. In a normal position shown in FIG. 4, pressure rods 19 which are pivotally connected at 15a to the ends of levers 14 abut with rollers 20 on shoulders 21 provided on support frame 1. The resilient force exerted by all elongated resilient members 12 to draw levers 14 toward each other, holds the load carrying frame 2 in a normal position in which the roller means 5 are located at the center of the ramp tracks.

When the load carrying frame is displaced in one direction, for example to the position shown in FIG. 5, movement of the shock receiving frame 1 to the right causes displacement of the right rod 19 with roller 20 to the right so that lever 14 on the right of FIG. 4 is turned to the illustrated position while the resilient members 12 are tensioned. The left lever 14 will be urged against the respective abutment 18, while the right lever 14 will move away from the corresponding abutment 18. While in the position of FIG. 4 the entire force produced by resilient members 12 acts on rods 19 and pivot means 16, only a component of the spring force acts on rod 19 on the right of FIG. 5 due to the displaced position of the right lever 14, and this horizontal component is reduced depending on the distance of relative displacement between the shock receiving frame and the load carrying frame. The resilient forces produced by resilient members 12 increase in accordance to the distance of displacement of joints 15 in horizontal direction, but since only a component of this force acts to restore the load carrying frame to its normal position, a substantially constant return force acts on the load carrying frame 1 irrespective of the amount of relative displacement between the load carrying frame and the shock receiving frame of the vehicle.

Only one return spring arrangement is shown in the plan view of FIG. 2 for the sake of simplicity, and it will be understood that the corresponding arrangement is provided on the other side of the vehicle to connect the shock receiving frame 1 with the load carrying frame 2. FIG. 5 shows only two double-armed levers 13, whereas FIG. 2 illustrates the actual construction in which two double-armed levers 13 are provided at each end, and at either side of the vehicle. Instead of three resilient elongated members 12 as shown in FIG. 5, five resilient members 12 are provided in the construction of FIG. 2. Joints 15 are respectively connected to the outer ends of the lounger levers 13 whose inner ends are connected, respectively to the inner ends of the shorter levers 13, the outer ends of which are connected to each other by a member 12 so that pulling forces at joints 15 tending to move the joints apart will produce tensile forces in all five elongated resilient members 12.

A shock in longitudinal direction of the vehicle is either produced by another vehicle 22, moving in the direction of the arrow shown in FIG. 5, or by a collision of a moving vehicle with a stationary vehicle or with a terminal stop. The shock is first received by the buffers 23 of the vehicle. Each buffer is provided in a conventional manner with resilient buffer springs, not shown, and with brake means dampening the expansion of the buffer spring after compression. Referring to FIG. 20, the graph $S_1$ illustrates the distance of movement of the buffer represented as ordinate over an abscissa representing the time. Graph P represents the force resisting the displacement of the buffer, and since the expansion of the buffer spring is braked, graph P is not continuous, and the buffer force suddenly drops to a lower lever at the moment in which compression of the buffer spring is terminated. From there on, the force of the buffer spring is gradually further reduced. During the compression of the buffer spring, a shock is transmitted to the load carrying frame so that the same is accelerated or decelerated in accordance with the graph $X_1$. Maximum acceleration, or deceleration, is reached when the compression force P of the buffer has its maximum, and is gradually reduced when the buffer force drops. Due to the sudden drop of the buffer force caused by the braking elements of the buffer, a corresponding drop takes place in the acceleration, or deceleration $X_1$ of the load carrying frame and of the load. The accelerated, or decelerated, load carrying frame 2, together with the load 24, moves relative to the shock receiving frame 1 out of the normal position illustrated in FIG. 4 so that the respective roller means 5a or 5b rolls upward along a rising ramp track 4 while being braked due to the fact that the one-way coupling 10, 11 is engaged during rotation of the roller in the respective direction of rotation. These forces counteract the acceleration or deceleration produced by the shock so that the same is reduced and finally reaches a negative value as indicated by the graph $X_1$. The braking force acting on the roller means is directly proportional to the weight of the load carrying frame 2 with load 24 since the load carrying frame is directly supported on the brake ring 7 in which the hubs of the rollers are located, no other shaft or axle being provided for roller means 5.

Consequently, a returning force is produced by the brake means and by the inclined ramp tracks which is proportional to the weight of the load, and counteracts the relative movement between the load carrying frame 2 and the shock receiving frame 1 and produces an absolute acceleration or deceleration which is constant during the duration of the shock effect, and is independent of the weight of the load, as represented by the graph $X_2$.

By suitably designing and calculating the gradient of the ramp tracks 4, and by calculating the brake force of brake means 7, 8, the return force can be determined and selected in such a manner that the absolute acceleration, or deceleration, of the load does not exceed a maximum selected value during any shock, independently of the force of the shock.

The vertical component produced by the mass of the load and acting through shock receiving frame 1 on the support springs 25 during the relative movement between the two frames, is maintained within tolerable limits by designing the ramp track 4 to have a very small gradient adjacent the horizontal center portion so that the vertical component of the shock force is small at the beginning of the shock where the shock force is the greatest.

When the maximum displacement of the load carrying frame relative to the shock receiving frame has occurred, the weight of the load carrying frame with the load acts to return the load carrying frame to its normal position with rollers 5 rolling down the respective ramp track 4. During such movement, the brake means are not effective, since the one-way clutch is disengaged during rotation of the respective roller means 5a, or 5b, in a direction of rotation corresponding to rolling down the respective ramp track.

The load carrying frame tends to move beyond its normal position with rollers 5 rolling up the opposite ramp track, but such movement is again braked by the brake means since the one-way clutch engages so that the load carrying frame is stopped when again beginning to mount, whereby extensive oscillations are prevented.

It is, however, desired that the load carrying frame stops in an exactly defined normal position, and the resilient return means 12 to 21 are provided.

In the diagram of FIG. 19, the total force 48 opposing relative displacement between the two frames out of the neutral position thereof is shown as a function of the relative displacement between the two frames. The total force 48 has one component 49 which has, in the preferred embodiment of the invention, been found to be about 70% thereof under average load conditions, and which is produced by the brake means 7, 8, 9. The remaining 30% of the total force 48 is made up of the horizontal component of the force produced by the inclined ramp track, as indicated at 50, and by the resilient force 51 produced by the return springs 12.

As explained above, the brake means 7, 8, 9 and the inclined ramp tracks produce counter forces proportional to the load during the entire time of relative displacement. The return force produced by the resilient members 12 is independent of the weight of the load, and proportional to the distance of relative displacement. This is compensated by the provision of the levers 14 which turn to such an angular position as to influence the component of the spring force acting to return the load carrying frame to its normal position. As the resilient force of the resilient members 12 increases upon relative displacement of the frames and angular displacement of one of the levers 14, as shown in the right side of FIG. 5, the latter assumes such a position that a component of the resilient force is taken up in vertical direction by joint 16 on load carrying frame 2, whereas the horizontal component is correspondingly reduced. In this manner, the force produced by the resilient return means 13 to 21 is held substantially constant during the entire relative motion of the two frames, and hardly influences the effect of the return force which is directly proportional to the weight of the load. In any event, it is preferred to produce only a small part, less than 15%, of the total return force by the resilient return means, as indicated by the diagram of FIG. 19.

In this manner, the constant acceleration and deceleration indicated by the graph $X_2$ in FIG. 20 is achieved, and by suitably designing the ramp tracks and the brakes, it is assured that the constant acceleration, or deceleration will not exceed the predetermined maximum amount so that any damage to the load is safely prevented, irrespective of the magnitude of shocks acting on the vehicle in longitudinal direction. In conventional constructions, the acceleration or deceleration of the load during the impact of a shock corresponds to the graph $X_1$, so that the peak acceleration exceeds the permissible magnitude so that the load is damaged by severe shocks.

The embodiment of the invention illustrated in FIGS. 1 to 8 is particularly applied to vehicles in which the vehicle frame is mounted by springs 25 on wheels and provided with buffers 23 so as to constitute a shock receiving frame. In the embodiment of FIGS. 9 to 16, the vehicle frame 26 which is mounted on the wheels, is the load carrying frame, and the shock receiving frame 27 has the form of a central beam located in the longitudinal plane of symmetry of the vehicle, and being mounted for movement in longitudinal direction on the load carrying frame 26 by means of rollers 28 which roll on corresponding horizontal tracks on load-carrying frame 26. A central buffer spring 120 surrounds a thin center portion of the beam, and resists longitudinal displacement of the shock receiving frame 27 which is provided at the ends with couplings 29.

Shafts 39 are mounted in corresponding bearings on load carrying frame 26 and have on the sides of the vehicles lever arms 38 connected by shackle links 37 to the ends of support springs 26 which are mounted on the bearings of the wheel shafts. Consequently, the weight of the load is transmitted through support springs 25 to the wheels of the vehicle, and the load carrying frame 26 can perform a resilient up and down movement together with shafts 39. Such up and down movement will cause turning of lever arms 38 with shaft 39, and with lever arms 40 secured to the inner ends of shafts 39.

The shock receiving frame 27 has pairs of oppositely inclined ramp tracks 30 with a substantially horizontal center portion and with inclined ramp track portion whose gradient gradually increases, as explained with reference to FIG. 8. Roller means 31 are located at the center portion of the several ramp tracks in the normal position of frames 26 and 27, and will roll up the rising ramp track 30 when is exerted on the shock receiving frame 27 and the same relative to the load carrying vehicle frame 26 while rollers 28 roll on frame 26. While in the embodiment of FIGS. 1 to 8, a pair of roller means is associated with one continuous ramp track, in the embodiment of FIGS. 9 to 16, a single roller means has two wheel flanges 31a, 31b, as best seen in FIG. 14 and cooperates with two parallel ramp tracks 30a and 30b which are correspondingly staggered in transverse direction, as also shown in FIGS. 10 and 13. Each ramp track 30a has a center portion and an inclined ramp track portion rising in a direction toward the right as viewed in FIG. 13, and each ramp track 30b has a center portion transversely spaced from ramp track 30a as shown in FIG. 14, and an inclined ramp track portion rising to the left as viewed in FIG. 13. Consequently wheel flange 31a will be operative to roll on ramp track 30a when moving to the right as viewed in FIG. 13, and will be inoperative when moving to the left as viewed in FIG. 13 since wheel flange 31a will not engage a ramp track. On the other hand, wheel flange 31b will be operative when moving to the left as viewed in FIG. 13 on the corresponding ramp track 30b. The construction of the roller means is best seen in FIGS. 14 and 15. The wheel flanges 31a and 31b have hub portions 32 connected to each other and mounted in a brake ring 33 for turning movement. Brake ring 33 is located within a semi-circular brake shoe 35 provided with a brake lining 34, so that the entire roller means turns about an axis defined by the semi-circular combined brake shoe and bearing 34, 35. The center of the semi-circular member 34, 25 defines the axis of rotation of the wheel flanges 31a, 31b. A one-way clutch is provided for each wheel flange 31a, 31b and includes spring-loaded pawls 41 biased to engage inner recesses of brake ring 33 to couple the same to the wheel flange in one direction of rotation only. The one-way clutches of the two wheel flanges are oriented in opposite directions of rotaation so that wheel flange 31a will be coupled to the brake ring 33 when moving upward on a ramp track 30a, while wheel flange 31b will be coupled to brake ring 33 when moving upward on an oppositely inclined ramp track 30b. When brake ring 33 is coupled to one or the other wheel flange, it will turn with the same so that the combined brake shoe and bearing 34, 35 will brake the turning movement of brake ring 33 and of the respective wheel flange coupled thereto. When a wheel flange 31a or 31b rolls back and down the inclined ramp track, the respective one-way clutch is disengaged, and the brake means 33, 34, 35 is ineffective.

Brake shoe and bearing 34, 35 is secured to a housing 36, and each housing 36 is provided at the end of a level 40 which, as explained above, moves with lever arm 38 and a respective shaft 39 when the load carrying vehicle frame 26 moves up or down. When the load carrying frame 26 is loaded, it will be lowered in accordance with the weight of the load whereby shafts 39 are lowered together with housing 36 so that the brake force depends on the weight of the load. In the same manner, the weight of the load is also transmitted through roller means 31a, 31b to the inclined ramp tracks 30a, 30b during relative movement between the two frames in longitudinal direction, so that the horizontal return force produced by the rising ramp tracks is also depending on the weight of the load which will press load carrying frame 26 and shaft 39 down so that lever arms 40 will turn toward the ramp tracks 30 due to the fact that the opposite lever arms 38 are held by the shackle links 37 on support springs 25.

The ramp tracks 30a and 30b are of trapezoid cross section, as best seen in FIG. 14, and have oppositely inclined faces on which correspondingly slanted faces of the wheel flanges 31a and 31b roll. Due to the wedge effect of the slanted faces, the friction between the wheel flanges and the ramp tracks is improved.

Resilient return means 12 to 21, as described with reference to FIGS. 2, 4 and 5, are also provided in the embodiment of FIGS. 9 to 16, but not illustrated for the sake of simplicity.

A modified construction of the resilient return means is illustrated in FIGS. 17 and 18 and may be substituted in either of the two embodiments of the invention for the resilient return means 12 to 21. While the resilient return means 12 to 21 accomplish a substantially constant return force by displacement of levers 14, the construction of FIGS. 17 and 18 provides no return spring force when the roller means are at the ends of the rising ramp tracks, and a constant return spring force when the roller means are on the slightly inclined ramp tracks adjacent the horizontal center portion on which the roller means rest in the normal position of the frames.

Torsion rods 43 are mounted on the load carrying frame 2 and each torsion rod 43 has at the ends thereof levers 44 provided with rollers 45. In the normal position of the frames, lever arms 44 are in vertical positions, abutting abutments 47 on shock receiving frame 1 with a slight pretension. Abutments 47 are respectively located on opposite sides of lever 44 and respectively effective to twist torsion rod 43 during displacement of load carrying frame in opposite directions.

Abutments 47 are low and rounded off so that each lever arm 44 which is turned by the abutment, will resist the movement only for a limited distance, and then permit roller 45 to roll on the top face of the respective abutment as shown in broken lines in FIG. 17. In this position of a roller 45 and lever 44, no horizontal return force is exerted on the respective abutment and frame, since the spring force acts in a vertical direction on the top face of the abutment. Therefore, the resilient return force produced by torsion rod 43 is only effective a short time near the region of the horizontal portion of the ramp tracks when the displacement of the frames starts. When the rollers roll back on the inclined ramp tracks, torsion rod 43 is at first not effective, but when the roller means approach the center portion of the ramp tracks, roller 45 rolls over the edge of the top face of abutment 47, engages the vertical face of the abutment, and resists movement of the same together with the respective frame so that the two frames are finally held in the normal position in which the arms 44 are vertical.

Due to the fact that the return spring force is effective only for a very short time, its influence on the entire return force is negligible, and consequently the return force depends for all practical purposes only on the weight of the load and of the load carrying frame. In any event, in both embodiments of the return spring means, no greater resilient return force is produced when the frames are displaced the greatest distance then when the frames are displaced a shorter distance. Conventional spring means will increase their spring force when the distance between the frames is increased.

The operation of the embodiment of FIGS. 9 to 16 corresponds substantially to the operation described with reference to the embodiment of FIGS. 1 to 8. When shock receiving frame 27 is subjected to a longitudinal shock, the buffer spring 120 is compressed and resists displacement of frame 27. However, the load carrying frame 26 moves relative to the shock receiving frame 27 with the respective wheel flanges 31a, or 31b, rolling up the corresponding rising ramp track 30a or 30b while being braked by the engagement between the brake ring 33 and the brake shoe 34, 35, the respective one-way clutch 41 being engaged in the respective direction of rotation. The brake force depends on the weight of the load which is transmitted through the linkage system 38, 39, 40, 36 to the brake means 33, 34, 35. Since the weight of the load is transmitted by the linkage lever system 38, 40 to the roller means 31 to the inclined ramp tracks, the return force produced by the rising ramp tracks also depends on the load so that the longitudinal acceleration or deceleration of the load carrying frame is substantially constant and does not exceed under any circumstances the maximum acceleration or deceleration at which no damage can be done to the load.

It will be understood that each of the elements described above, or two or more together, may also find a useful application in other types of shock absorbing assemblies differing from the types described above.

While the invention has been illustrated and described as embodied in a longitudinal shock absorbing assembly in which the longitudinal return forces are proportional to the load so that a constant acceleration or deceleration of the load is achieved, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A longitudinal shock absorbing assembly comprising, in combination, first elongated shock receiving frame means disposed to receive longitudinal shocks, and second elongated load carrying frame means, one of said frame means having longitudinal ramp tracks upwardly rising in opposite directions with respect to a horizontal plane; roller means connected to the other frame means for longitudinal movement therewith and engaging said ramp tracks resting thereon and running along the same so as to transmit the weight of a load on said second load carrying frame means to said supporting frame means; and brake means actuated only during movement of said roller means toward the higher ends of said ramp tracks, said brake means being not actuated during movement of said roller means away from said higher ends of said ramp tracks, said brake means being applied during said movement of said roller means toward the higher ends of said ramp tracks by the weight of said load on said load carrying frame to brake relative longitudinal movement between said first and second frame means with a force depending on the weight of the load.

2. A longitudinal shock absorbing assembly comprising, in combination, first elongated shock receiving frame means disposed to receive longitudinal shocks, and second elongated load carrying frame means, one of said frame means having longitudinal ramp tracks upwardly rising in opposite directions with respect to a horizontal plane; roller means connected to the other frame means for longitudinal movement therewith and engaging said ramp tracks resting thereon and running along the same so as to transmit the weight of a load on said second load carrying frame means to said first supporting frame means; brake means actuated only during movement of said roller means toward the higher ends of said ramp tracks, said brake means being not actuated during movement of said roller means away from said higher ends of said ramp tracks, said brake means being applied during said movement of said roller means toward the higher ends of said ramp tracks by the weight of said load on said load carrying frame to brake relative longitudinal movement between said first and second frame means with a force depending on the weight of the load; and resilient means connecting said first and second frame means for urging said second frame means in longitudinal direction to a normal position in which said roller means are located between oppositely inclined ramp tracks, said resilient means being constructed and arranged so that no greater resilient force acts on said second frame means when the same is displaced the greatest distance relative to said first frame means than when displaced a shorter distance.

3. A longitudinal shock absorbing assembly comprising, in combination, first elongated shock receiving frame means disposed to receive longitudinal shocks, and second elongated load carrying frame means, one of said frame means having longitudinal ramp tracks upwardly rising in opposite directions with respect to a horizontal plane; roller means connected to the other frame means for longitudinal movement therewith and engaging said tracks resting thereon and running along the same so as to transmit the weight of a load on said second load carrying frame means to said first supporting frame means; and brake means including a first brake part connected to said roller means for rotation and a second brake part connected to said second frame means, said first and second brake parts being in braking engagement only during movement of said roller means toward the higher ends of said ramp tracks while being out of braking engagement during movement of said roller means away from the higher ends of said ramp tracks, said second brake part being urged by the weight of the load on said second frame means against said first brake part so that during braking engagement of said first and second brake parts said brake means brake said roller means and thereby relative longitudinal movement between said first and second frame means with a force depending on the weight of the load.

4. A longitudinal shock absorbing assembly comprising, in combination, first elongated shock receiving frame means disposed to receive longitudinal shocks, and second elongated load carrying frame means, one of said frame means having longitudinal ramp tracks upwardly rising in opposite directions with respect to a horizontal plane; roller means connected to the other frame means for longitudinal movement therewith and engaging said ramp tracks resting thereon and running along the same so as to transmit the weight of a load on said second load carrying frame means to said first supporting frame means; brake means including a first brake part and a second brake part, said second brake part connected to said second frame means; one-way clutch means connecting said roller means with said first brake part so as to couple said roller means with said first brake part only during movement of said roller means toward the higher ends of said ramp tracks, said second brake means being urged by the weight of the load on said second frame means against said first brake part so that during movement of said roller means along said rising ramp tracks toward the higher ends thereof said brake means brake said roller means and thereby relative longitudinal movement between said first and second frame means with a force depending on the weight of the load; and resilient means connecting said first and second frame means for urging said second frame means in a longitudinal direction to a normal position in which said roller means are located between oppositely inclined ramp tracks, said resilient means being constructed and arranged so that no greater resilient force acts on said second frame means when the same is displaced the greatest distance relative to said first frame means than when displaced a shorter distance.

5. A longitudinal shock absorbing assembly as set forth in claim 4 wherein said first shock receiving frame means has wheels and buffer means at the ends thereof and is connected with said second frame means for longitudinal movement only by said roller means and ramp track means, and by said resilient means.

6. A longitudinal shock absorbing assembly as set forth in claim 4 and including wheels; support springs connected to said wheels and supporting said second load carrying frame means on said wheels; and a linkage lever system connecting said support springs with said roller means and with said second brake part so that the weight of the load on said second load carrying frame means is transmitted through said roller means and ramp tracks to said first frame means, and actuates said brake means.

7. A longitudinal shock absorbing assembly as set forth in claim 6 wherein said first frame means includes a longitudinal beam in the longitudinal plane of symmetry of said frame means, and rollers mounted on said beam and rolling on said second frame means, said beam having said ramp tracks.

8. A longitudinal shock absorbing assembly for vehicles, particularly railroad cars, comprising, in combination, first elongated shock receiving frame means disposed to receive longitudinal shocks and having longitudinal ramp tracks upwardly rising in opposite directions; second elongated load carrying frame means; roller means connected to said second frame means for longitudinal movement therewith and resting on said ramp tracks to transmit the weight of a load on said second load carrying frame means to said first frame means; and brake means including a first brake part connected to said roller means for rotation and a second brake part connected to said second frame means, said first and second brake parts being in braking engagement only during movement of said roller means toward the higher ends of said upwardly rising ramp tracks while being out of braking engagement during movement of said roller means away from the higher ends of said upwardly rising ramp tracks, said second brake part being urged by the weight of the load on said second frame means against said first brake part so that said brake means brake, only during movement of said roller means toward the higher ends of said ramp tracks, said roller means and thereby relative longitudinal movement between said first and second frame means with a force dependent on the weight of the load.

9. A longitudinal shock absorbing assembly for vehicles, particularly railroad cars, comprising, in combination, first elongated shock receiving frame means disposed to receive longitudinal shocks and having longitudinal ramp tracks upwardly rising in opposite directions; second elongated load carrying frame means; roller means connected to said second frame means for longitudinal movement therewith and resting on said ramp tracks to transmit the weight of a load on said second load carrying frame means to said first frame means; and brake means including a first brake part connected to said first frame means for movement during relative displacement of said first and second frame means and a second brake part connected to said second frame means, said first and second brake parts being in braking engagement only during movement of said roller means toward the higher ends of said upwardly rising ramp tracks while being out of braking engagement during movement of said roller means away from the higher ends of said upwardly rising ramp tracks, said second brake part being urged by the weight of the load on said second frame means against said first brake part so that said brake means brake, only during movement of said roller means toward the higher ends of said ramp tracks, relative longitudinal movement between said first and second frame means with a force dependent on the weight of the load; and resilient means connecting said first and second frame means for urging said second frame means in longitudinal direction to a normal position wherein said roller means are located at the lowest points of said ramp tracks, said resilient means being constructed and arranged so that a substantially constant resilient force acts on said second frame means.

10. A longitudinal shock absorbing assembly as set forth in claim 9 and including means for reducing the resilient force of said resilient means when said roller means are near the ends of said ramp tracks so that great relative displacement between said first and second frame means does not cause an increase of the spring force acting on said second frame means.

11. A longitudinal shock absorbing assembly as set forth in claim 9 wherein said first frame means has wheels and buffer means at the ends thereof and is connected with said second frame means for longitudinal movement by said roller means and ramp track means, and by said resilient means.

12. A longitudinal shock absorbing assembly as set forth in claim 9 and including wheels; support springs connected to said wheels and supporting said second load carrying frame means on said wheels; and a linkage lever system connecting said support springs with said roller means and with said second brake part so that the weight of the load on said second load carrying frame means is transmitted through said roller means and ramp tracks to said first frame means, and actuates said brake means.

13. A longitudinal shock absorbing assembly for vehicles, particularly railroad cars, comprising, in combination, first elongated shock receiving frame means disposed to receive longitudinal shocks and having longitudinal ramp tracks upwardly rising in opposite directions; second elongated load carrying frame means; roller means including wheel flange means resting on said ramp tracks and hub means, brake ring means surrounding said hub means, one-way clutch means connecting said hub means with said brake ring means so as to couple said wheel flange means with said brake ring means only during movement of said wheel flange means toward the higher ends of said ramp tracks; and brake means secured to said second frame means and resting on said brake ring means to transmit the weight of a load on said second frame means to said first frame means and for producing a braking force depending on the weight of the load on said second frame means during movement of said wheel flange means along said rising ramp tracks so that said brake means brake said roller means and thereby relative longitudinal relative movement between said first and second frame means with a force dependent on the weight of the load.

14. A longitudinal shock absorbing assembly as set forth in claim 13 wherein oppositely rising ramp tracks are aligned and include a horizontal center portion; and wherein pairs of said roller means are located on said center portion so that only one of said roller means transmits the weight of the load during movement of said second frame relative to said first frame in either of said opposite directions and so that only the respective one roller means is braked by said brake means.

15. A longitudinal shock absorbing assembly as set forth in claim 13 wherein said ramp tracks include a first ramp track rising in one direction, and a second ramp track rising in the opposite direction and being transversely spaced from said first ramp track, the lowest points of said first and second ramp tracks being located in a common transverse plane; and wherein each roller means includes a pair of wheel flange means respectively resting on said first and second ramp tracks and being connected by said hub means and wherein said one-way clutch means include two one-way clutches effective in opposite directions of rotation and respectively connecting said pairs of wheel flange means with said brake ring means.

16. A longitudinal shock absorbing assembly as set forth in claim 13 wherein said ramp tracks have faces extending at angles to vertical and horizontal planes; and wherein said wheel flange means have frusto-conical faces slanted at the corresponding angle and rolling on said faces.

17. A longitudinal shock absorbing assembly as set forth in claim 9 wherein said first brake part has brake faces, and wherein said second brake part includes brake shoe means having a braking condition pressing against said brake faces and a second inoperative condition, and means for placing said brake shoe means in said braking position only when said roller means move upwardly along a rising ramp track.

18. A longitudinal shock absorbing assembly as set forth in claim 9 wherein said ramp tracks have a gradient of approximately 4° at their lowest portions, a gradient of approximately 10° at the middle portions thereof, and a gradient approaching 80° at the ends thereof.

19. A longitudinal shock absorbing assembly as set forth in claim 9 wherein said resilient means includes a plurality of elongated members extending along the length of said frame means, and lever means connected to said members and mounted on said frame means to transmit forces between said first and second frame means in such a manner that angular displacement of said lever means during relative movement between said first and second frame means will cause a component of the resilient force exerted by said elongated member to act on said frame means in such a manner that the resilient force component for returning said second frame means to the normal position thereof is substantially constant in positions in which said first and second frame means are displaced to each other in said longitudinal direction.

20. A longitudinal shock absorbing assembly as set forth in claim 9 wherein said resilient means include torsion rod means mounted on one of said frame means for turning movement and having at the ends thereof lever arms carrying followers, and abutment members on said first and second frame means engaging said followers in the normal position of said first and second frame means, at least one of said abutment members having such a shape that the respective follower passes beyond said abutment member when said roller means have moved a predetermined distance upwardly on said rising ramp tracks so that no resilient force acts on said second frame means to return the same to said normal position when said roller means move beyond said distance during relative movement between said first and second frame means.

References Cited by the Examiner
UNITED STATES PATENTS

| | | | |
|---|---|---|---|
| 569,094 | 10/1896 | Dunlop | 105—454 |
| 1,503,845 | 8/1924 | Olm | 188—82.77 |
| 1,940,953 | 12/1933 | Kellett | 105—392.5 |
| 2,040,486 | 5/1936 | Kellett | 105—392.5 |
| 2,341,753 | 2/1944 | Zwald | 188—82.77 |
| 2,687,785 | 8/1954 | Whitney | 188—82.7 |
| 3,003,436 | 10/1961 | Peterson | 105—454 |
| 3,079,897 | 3/1963 | Kirsch. | |

ARTHUR L. LA POINT, *Primary Examiner.*

D. E. HOFFMAN, *Assistant Examiner.*